US011510147B2

(12) United States Patent
Balasubramanian et al.

(10) Patent No.: US 11,510,147 B2
(45) Date of Patent: Nov. 22, 2022

(54) SIDELINK RESOURCE SELECTION ASSISTANCE AND PAGING

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US); Sudhir Kumar Baghel, Hillsborough, NJ (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 17/247,162

(22) Filed: Dec. 2, 2020

(65) Prior Publication Data

US 2021/0204217 A1 Jul. 1, 2021

Related U.S. Application Data

(60) Provisional application No. 62/954,207, filed on Dec. 27, 2019.

(51) Int. Cl.
*H04W 52/02* (2009.01)
*H04W 72/04* (2009.01)

(52) U.S. Cl.
CPC ....... *H04W 52/0235* (2013.01); *H04W 72/04* (2013.01)

(58) Field of Classification Search
CPC .... H04W 52/0235; H04W 72/04; H04W 4/40
See application file for complete search history.

(56) References Cited

U.S. PATENT DOCUMENTS

| 2018/0124771 | A1* | 5/2018 | Mok | H04W 24/10 |
| 2019/0394786 | A1 | 12/2019 | Parron et al. | |
| 2020/0053647 | A1* | 2/2020 | Chae | H04W 56/001 |
| 2020/0383088 | A1* | 12/2020 | Min | H04W 72/042 |
| 2021/0298030 | A1* | 9/2021 | Li | H04L 5/0048 |
| 2021/0368372 | A1* | 11/2021 | Chen | H04W 24/08 |

OTHER PUBLICATIONS

International Search Report and Written Opinion—PCT/US2020/070846—ISA/EPO—dated Mar. 15, 2021.
ZTE Corporation et al., "Discussion on NR V2X CBR", 3GPP Draft, R2-1914538, 3rd Generation Partnership Project (3GPP), Mobile Competence Centre, 650, Route Des Lucioles, F-06921 Sophia-Antipolis Cedex, France, vol. RAN WG2, No. Reno, Nevada, USA, Nov. 18, 2019-Nov. 22, 2019 Nov. 8, 2019 (Nov. 8, 2019), XP051816604, 5 Pages, Retrieved from the Internet: URL: https://ftp.3gpp.org/tsg_ran/WG2_RL2/TSGR2_108/Docs/R2-1914538.zip R2-1914538 Consideration on NR V2X CBR.doc [retrieved on Nov. 8, 2019], section 1-3.

\* cited by examiner

*Primary Examiner* — Robert C Scheibel
(74) *Attorney, Agent, or Firm* — Harrity & Harrity, LLP

(57) ABSTRACT

Various aspects of the present disclosure generally relate to wireless communication. In some aspects, a user equipment (UE) may obtain one or more measurements associated with a sidelink resource pool that includes one or more time and frequency resources allocated to sidelink transmissions to or from the UE. The UE may transmit, to an assisted UE, sidelink signaling that includes signaling to wake up the assisted UE and resource assistance information indicating the one or more measurements associated with the sidelink resource pool. Numerous other aspects are provided.

32 Claims, 11 Drawing Sheets

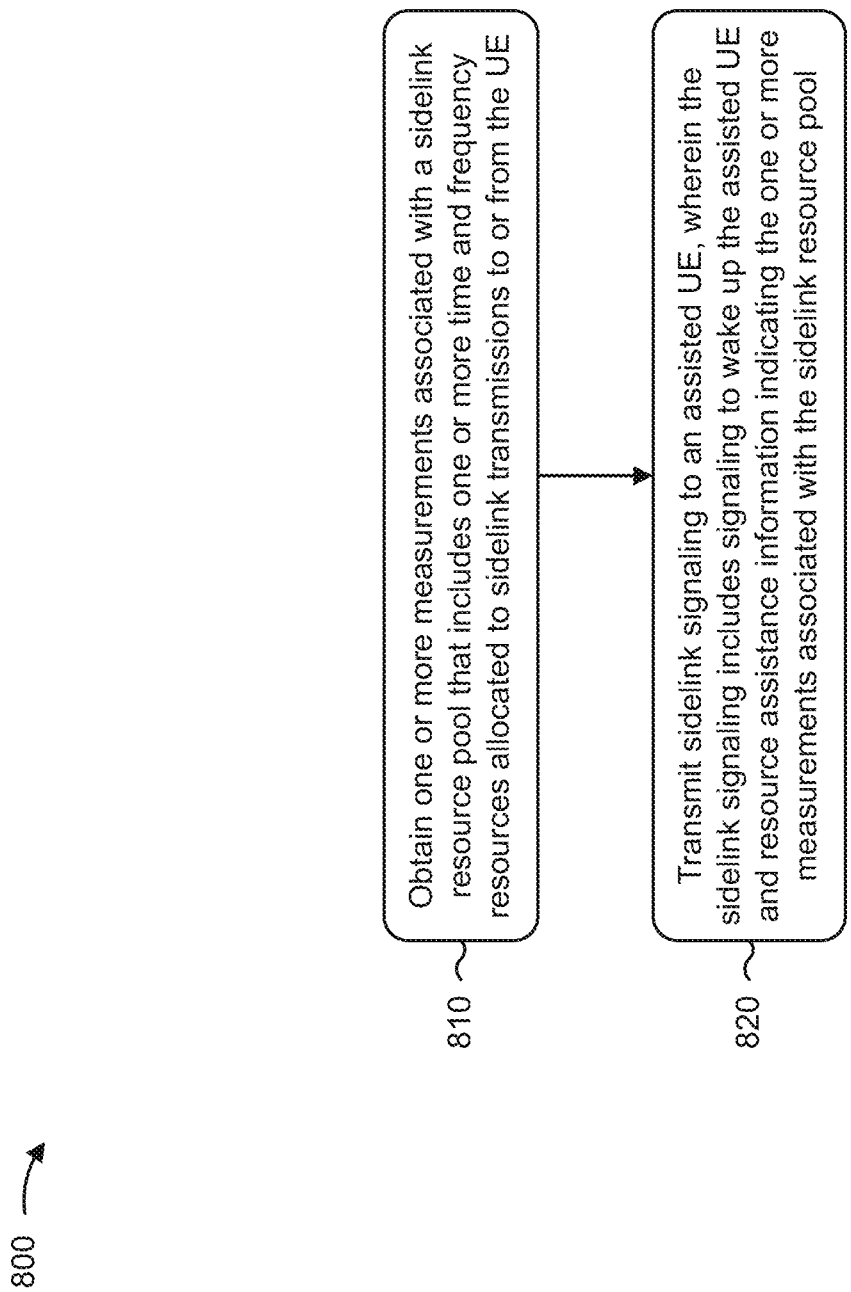

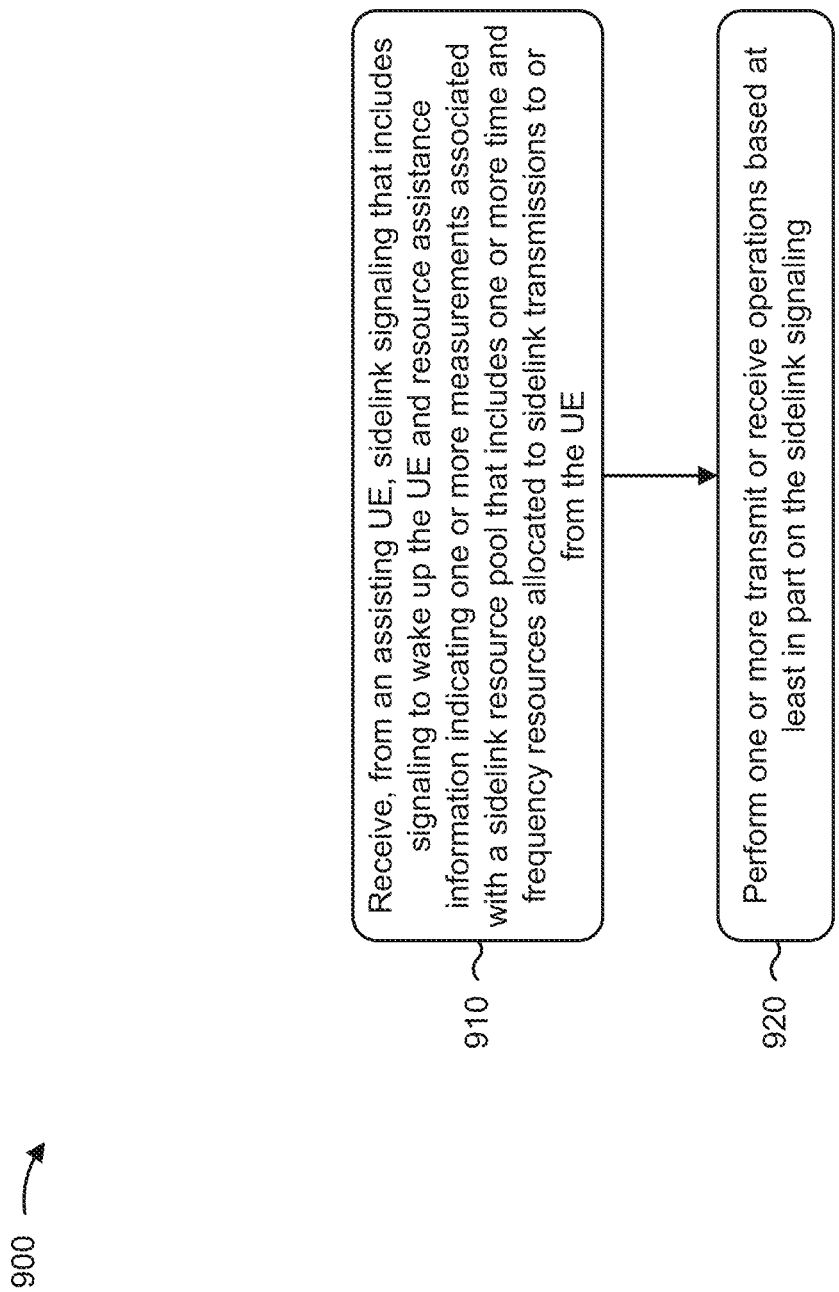

SIDELINK RESOURCE SELECTION ASSISTANCE AND PAGING

CROSS-REFERENCE TO RELATED APPLICATION

This Patent Application claims priority to U.S. Provisional Patent Application No. 62/954,207, filed on Dec. 27, 2019, entitled "SIDELINK RESOURCE SELECTION ASSISTANCE AND PAGING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink resource selection assistance and paging.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: obtaining one or more measurements associated with a sidelink resource pool that includes one or more time and frequency resources allocated to sidelink transmissions to or from the UE; and transmitting sidelink signaling to an assisted UE, wherein the sidelink signaling includes signaling to wake up the assisted UE and resource assistance information indicating the one or more measurements associated with the sidelink resource pool.

In some aspects, a UE for wireless communication may include a memory and one or more processors operatively coupled to the memory. The memory and the one or more processors may be configured to: obtain one or more measurements associated with a sidelink resource pool that includes one or more time and frequency resources allocated to sidelink transmissions to or from the UE; and transmit sidelink signaling to an assisted UE, wherein the sidelink signaling includes signaling to wake up the assisted UE and resource assistance information indicating the one or more measurements associated with the sidelink resource pool.

In some aspects, a non-transitory computer-readable medium may store one or more instructions for wireless communication. The one or more instructions, when executed by one or more processors of a UE, may cause the one or more processors to: obtain one or more measurements associated with a sidelink resource pool that includes one or more time and frequency resources allocated to sidelink transmissions to or from the UE; and transmit sidelink signaling to an assisted UE, wherein the sidelink signaling includes signaling to wake up the assisted UE and resource assistance information indicating the one or more measurements associated with the sidelink resource pool.

In some aspects, an apparatus for wireless communication may include: means for obtaining one or more measurements associated with a sidelink resource pool that includes one or more time and frequency resources allocated to sidelink transmissions to or from the apparatus; and means for transmitting sidelink signaling to an assisted UE, wherein the sidelink signaling includes signaling to wake up the assisted UE and resource assistance information indicating the one or more measurements associated with the sidelink resource pool.

In some aspects, a method of wireless communication, performed by a UE, may include: receiving, from an assisting UE, sidelink signaling that includes signaling to wake up the UE and resource assistance information indicating one or more measurements associated with a sidelink resource pool that includes one or more time and frequency resources allocated to sidelink transmissions to or from the UE; and performing one or more transmit or receive operations based at least in part on the sidelink signaling.

In some aspects, a UE for wireless communication may include a memory and one or more processors operatively coupled to the memory. The memory and the one or more processors may be configured to: receive, from an assisting UE, sidelink signaling that includes signaling to wake up the UE and resource assistance information indicating one or more measurements associated with a sidelink resource pool that includes one or more time and frequency resources allocated to sidelink transmissions to or from the UE; and perform one or more transmit or receive operations based at least in part on the sidelink signaling.

In some aspects, a non-transitory computer-readable medium may store one or more instructions for wireless communication. The one or more instructions, when executed by one or more processors of a UE, may cause the one or more processors to: receive, from an assisting UE, sidelink signaling that includes signaling to wake up the UE and resource assistance information indicating one or more measurements associated with a sidelink resource pool that includes one or more time and frequency resources allocated to sidelink transmissions to or from the UE; and perform one or more transmit or receive operations based at least in part on the sidelink signaling.

In some aspects, an apparatus for wireless communication may include: means for receiving, from an assisting UE, sidelink signaling that includes signaling to wake up the apparatus and resource assistance information indicating one or more measurements associated with a sidelink resource pool that includes one or more time and frequency resources allocated to sidelink transmissions to or from the apparatus; and means for performing one or more transmit or receive operations based at least in part on the sidelink signaling.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-9 are diagrams illustrating example processes performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
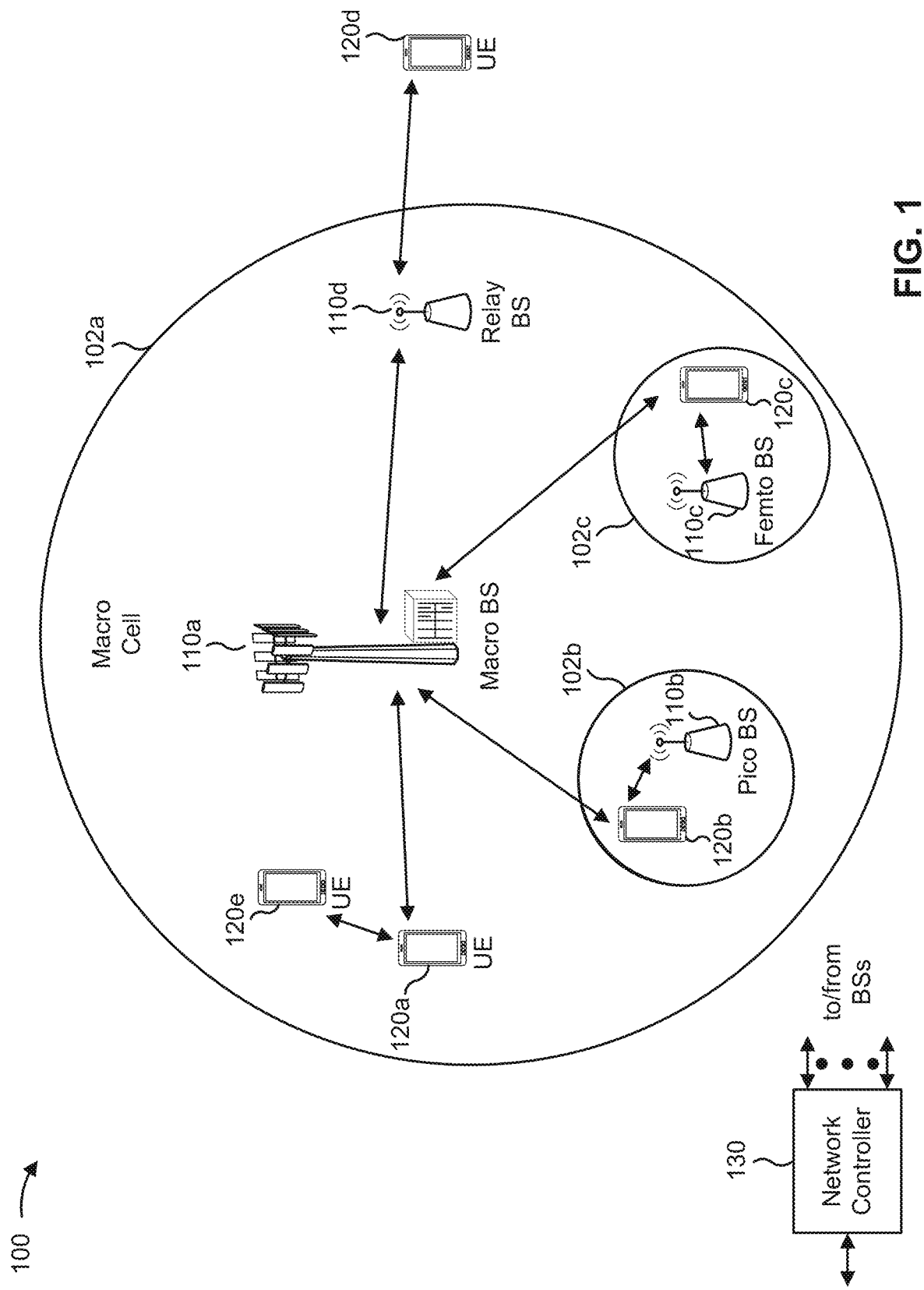
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, a vehicle-to-pedestrian (V2P) protocol, a vehicle-to-network (V2N) protocol, and/or the like), a mesh network, and/or the like. In this case, the UE 120 may perform scheduling operations, resource selection operations, and/or other operations described elsewhere herein as being performed by the base station 110.

Furthermore, in some aspects, the UE 120 may perform operations that relate to sidelink resource selection assistance and paging. For example, as described in further detail elsewhere herein, the UE 120 may be an assisting UE 120 that obtains one or more measurements associated with a sidelink resource pool that includes one or more time and frequency resources allocated to sidelink transmissions to or from the UE 120, and the assisting UE 120 may transmit sidelink signaling that includes a sidelink wakeup signaling and/or resource assistance information (RAI) indicating the one or more measurements associated with the sidelink resource pool to another (assisted) UE 120. Accordingly, the assisted UE 120 may use the RAI and/or other information contained in the sidelink signaling (e.g., the sidelink wakeup signal) to perform one or more sidelink transmit and/or receive operations (e.g., using the RAI to select a resource to transmit information using the sidelink resource pool that includes time and frequency resources allocated to sidelink transmissions by the assisted UE 120, using the sidelink wakeup signal to schedule reception of information from the assisting UE 120 using a sidelink resource pool that includes time and frequency resources allocated to sidelink transmissions by the assisting UE 120, and/or the like).

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
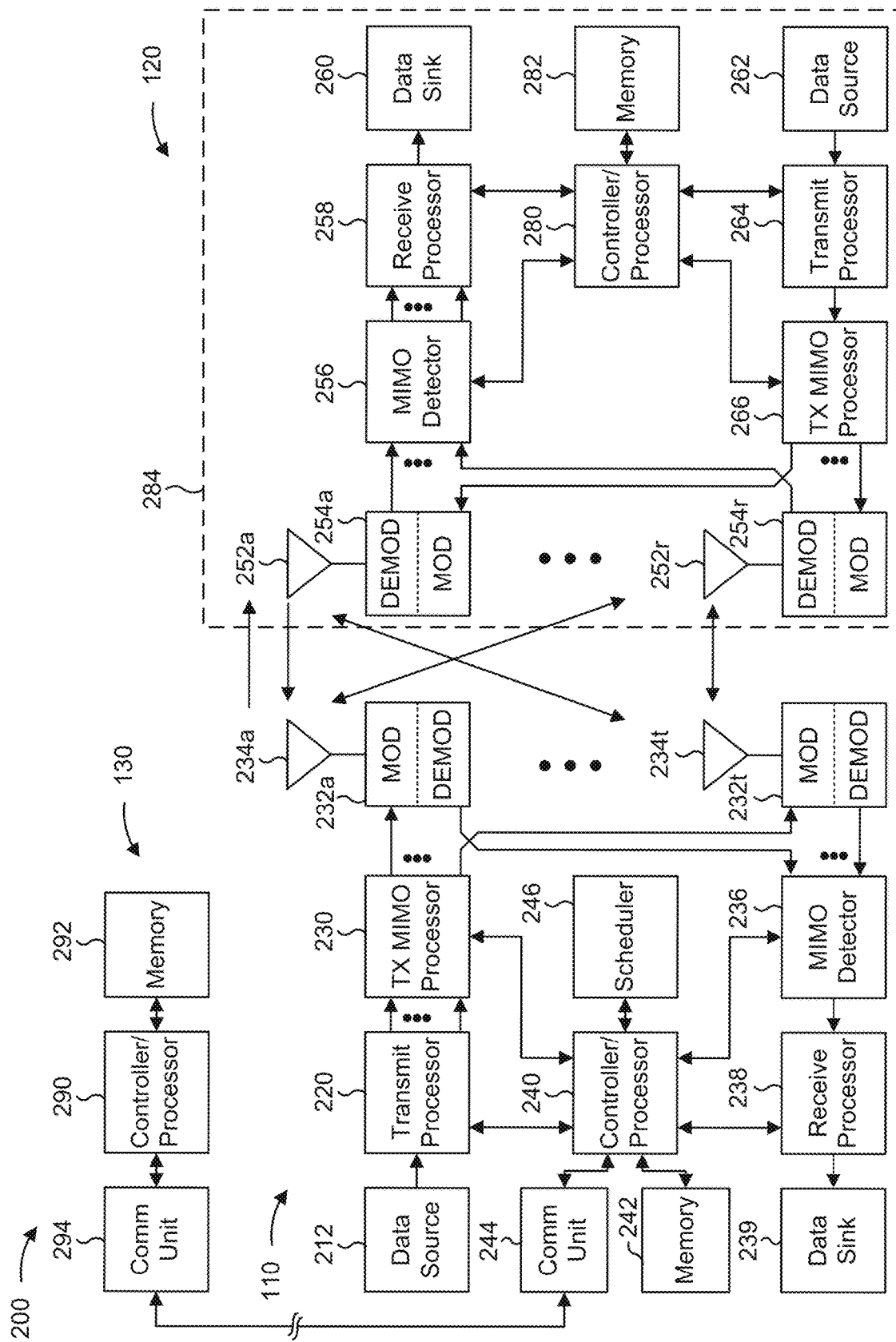
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs.

Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with sidelink resource selection assistance and paging, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, interpreting the instructions, and/or the like.

In some aspects, UE 120 may include means for obtaining one or more measurements associated with a sidelink resource pool that includes one or more time and frequency resources allocated to sidelink transmissions to or from UE 120, means for transmitting, to an assisted UE 120, sidelink signaling that includes signaling to wake up the assisted UE 120 and resource assistance information indicating the one or more measurements associated with the sidelink resource pool, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

Additionally, or alternatively, in some aspects, UE 120 may include means for receiving, from an assisting UE 120, sidelink signaling that includes signaling to wake up the UE 120 and resource assistance information indicating one or more measurements associated with a sidelink resource pool that includes one or more time and frequency resources allocated to sidelink transmissions to or from the UE 120, means for performing one or more transmit or receive operations based at least in part on the sidelink signaling, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
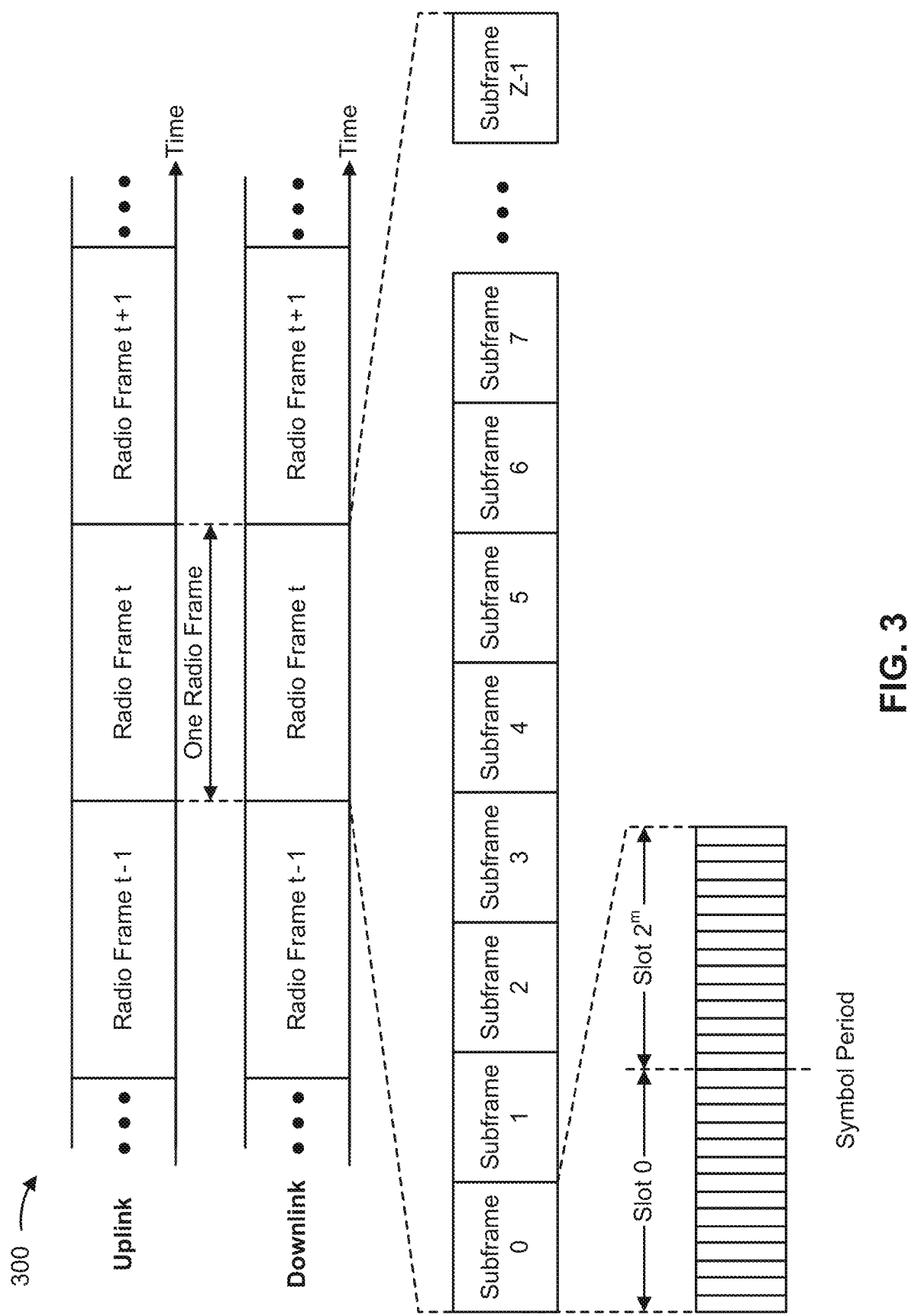
FIG. 3 is a diagram illustrating an example of a frame structure in a wireless network, in accordance with various aspects of the present disclosure.

FIG. 3 shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks).

As indicated above, FIG. 3 is provided as an example. Other examples may differ from what is described with regard to FIG. 3.

Figure 4:
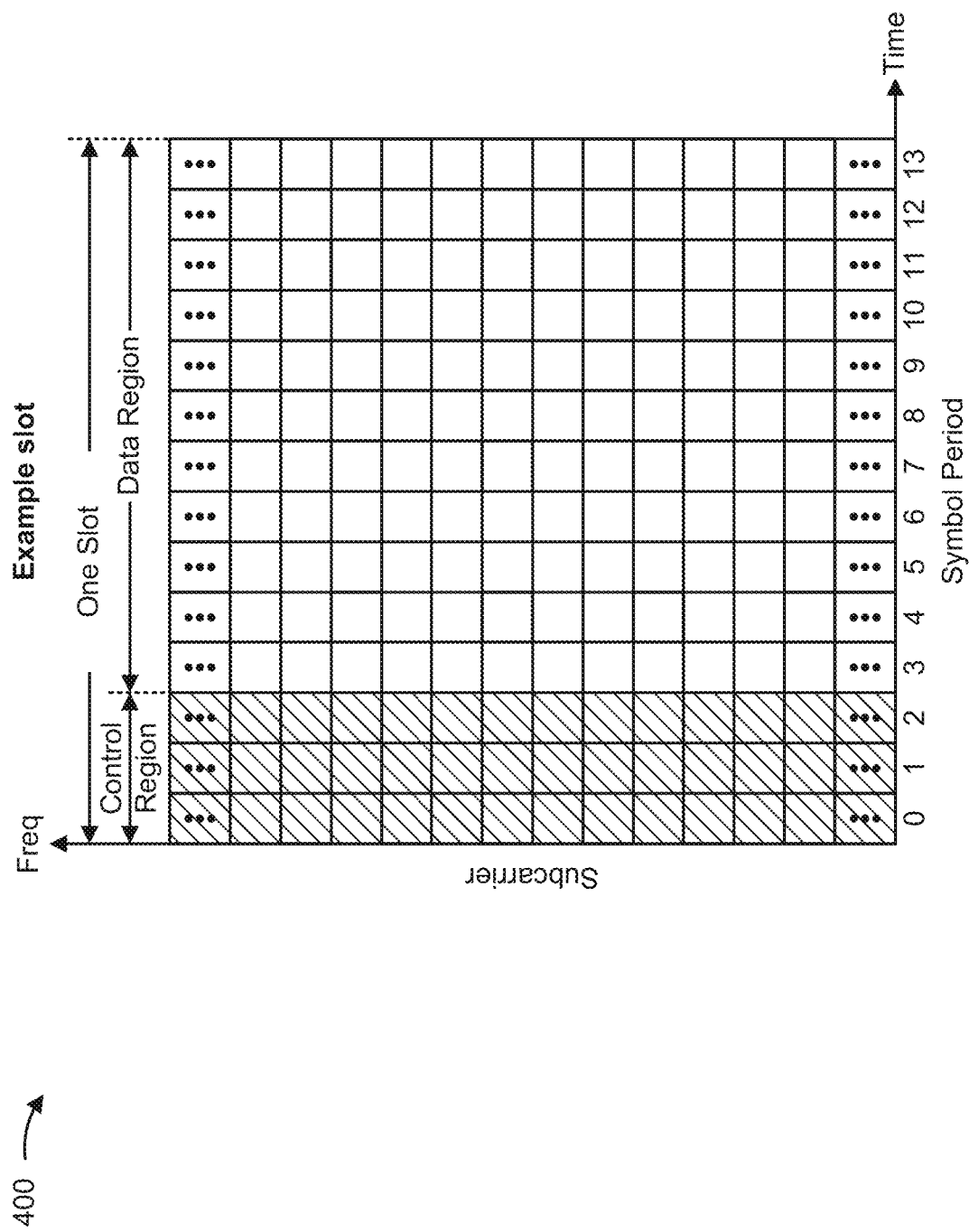
FIG. 4 is a diagram illustrating an example slot format, in accordance with various aspects of the present disclosure.

FIG. 4 shows an example slot format 400. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

In some circumstances, two or more subordinate entities (e.g., UEs) may communicate with each other using sidelink signals. Real-world applications of such sidelink communications may include public safety, proximity services, UE-to-network relaying, vehicle-to-everything (V2X) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through a scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

As indicated above, FIG. 4 is provided as an example. Other examples may differ from what is described with regard to FIG. 4.

Figure 5:
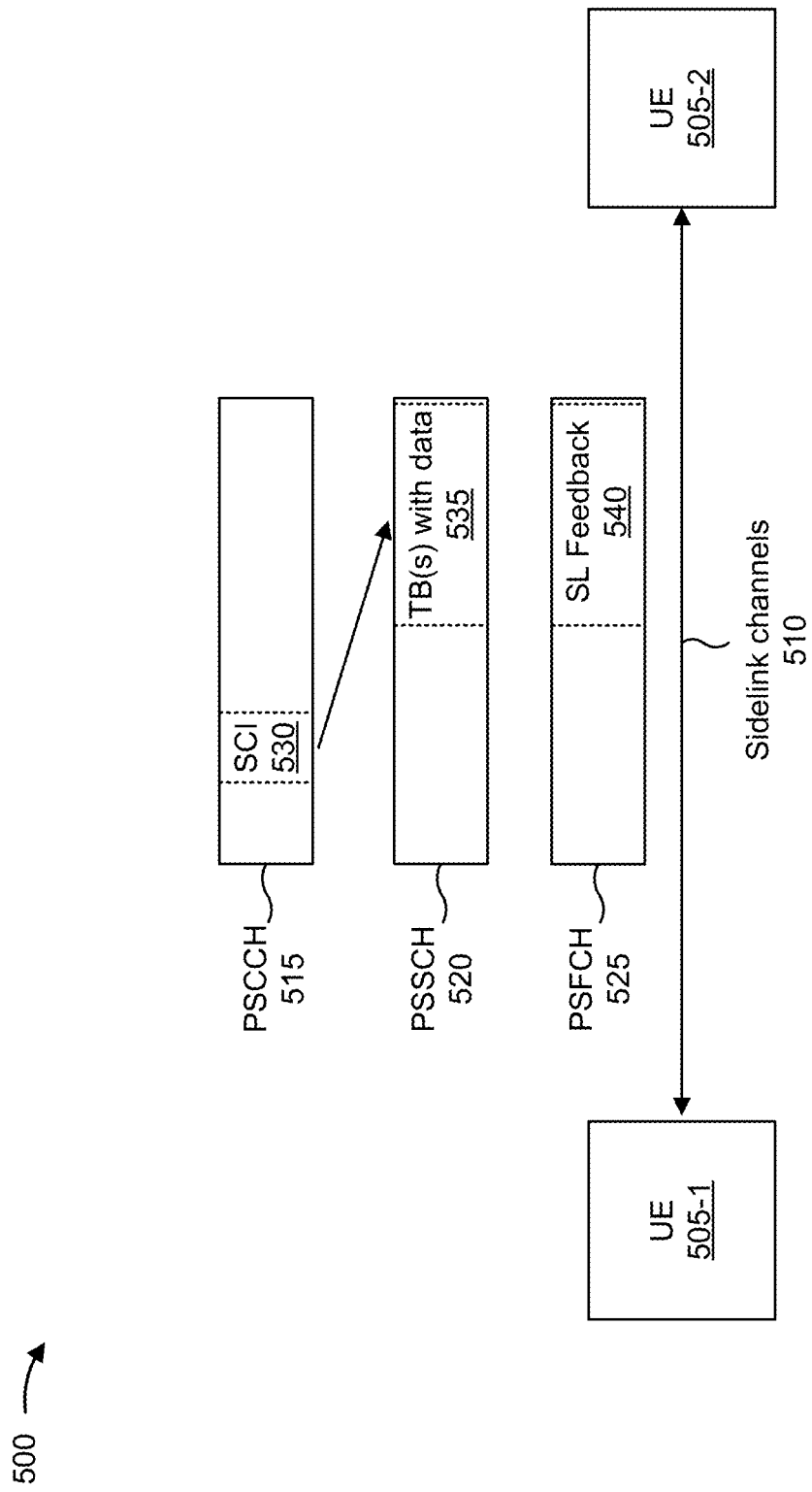
FIG. 5 is a diagram illustrating an example of sidelink communications, in accordance with various aspects of the present disclosure.

FIG. 5 is a diagram illustrating an example 500 of sidelink communications, in accordance with various aspects of the present disclosure.

As shown in FIG. 5, a first UE 505-1 may communicate with a second UE 505-2 (and one or more other UEs 505) via one or more sidelink channels 510. The UEs 505-1 and 505-2 may communicate using the one or more sidelink channels 510 for P2P communications, D2D communications, V2X communications (e.g., which may include V2V communications, V2I communications, V2P communications, and/or the like), mesh networking, and/or the like. In some aspects, the UEs 505 (e.g., UE 505-1 and/or UE 505-2) may correspond to one or more other UEs described elsewhere herein, such as UE 120. In some aspects, the one or more sidelink channels 510 may use a PC5 interface and/or may operate in a high frequency band (e.g., the 5.9 GHz band). Additionally, or alternatively, the UEs 505 may synchronize timing of transmission time intervals (TTIs) (e.g., frames, subframes, slots, symbols, and/or the like) using global navigation satellite system (GNSS) timing.

As further shown in FIG. 5, the one or more sidelink channels 510 may include a physical sidelink control channel (PSCCH) 515, a physical sidelink shared channel (PSSCH) 520, and/or a physical sidelink feedback channel (PSFCH) 525. The PSCCH 515 may be used to communicate control information, similar to a physical downlink control channel (PDCCH) and/or a physical uplink control channel (PUCCH) used for cellular communications with a base station 110 via an access link or an access channel. The PSSCH 520 may be used to communicate data, similar to a physical downlink shared channel (PDSCH) and/or a physical uplink shared channel (PUSCH) used for cellular communications with a base station 110 via an access link or an access channel. For example, the PSCCH 515 may carry sidelink control information (SCI) 530, which may indicate various control information used for sidelink communications, such as one or more resources (e.g., time resources, frequency resources, spatial resources, and/or the like) where a transport block (TB) 535 may be carried on the PSSCH 520. The TB 535 may include data. The PSFCH 525 may be used to communicate sidelink feedback 540, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 510 may use resource pools. For example, a scheduling assignment (e.g., included in SCI 530) may be transmitted in sub-channels using specific resource blocks (RBs) across time. In some aspects, data transmissions (e.g., on the PSSCH 520) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 505 may operate using a transmission mode where resource selection and/or scheduling is performed by the UE 505 (e.g., rather than a base station 110). In some aspects, the UE 505 may perform resource selection and/or scheduling by sensing channel availability for transmissions. For example, the UE 505 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 505 may perform resource selection and/or scheduling using SCI 530 received in the PSCCH 515, which may indicate occupied resources, channel parameters, and/or the like. Additionally, or alternatively, the UE 505 may perform resource selection and/or scheduling by determining a channel busy rate (CBR) associated with various sidelink channels, which may be used for rate control (e.g., by indicating a maximum number of resource blocks that the UE 505 can use for a particular set of subframes).

In the transmission mode where resource selection and/or scheduling is performed by a UE 505, the UE 505 may generate sidelink grants, and may transmit the grants in SCI 530. A sidelink grant may indicate, for example, one or more parameters (e.g., transmission parameters) to be used for an upcoming sidelink transmission, such as one or more resource blocks to be used for the upcoming sidelink transmission on the PSSCH 520 (e.g., for TBs 535), one or more subframes to be used for the upcoming sidelink transmission, a modulation and coding scheme (MCS) to be used for the upcoming sidelink transmission, and/or the like. In some aspects, a UE 505 may generate a sidelink grant that indicates one or more parameters for semi-persistent scheduling (SPS), such as a periodicity of a sidelink transmission. Additionally, or alternatively, the UE 505 may generate a sidelink grant for event-driven scheduling, such as for an on-demand sidelink message.

As indicated above, FIG. 5 is provided as an example. Other examples may differ from what is described with respect to FIG. 5.

Figure 6:
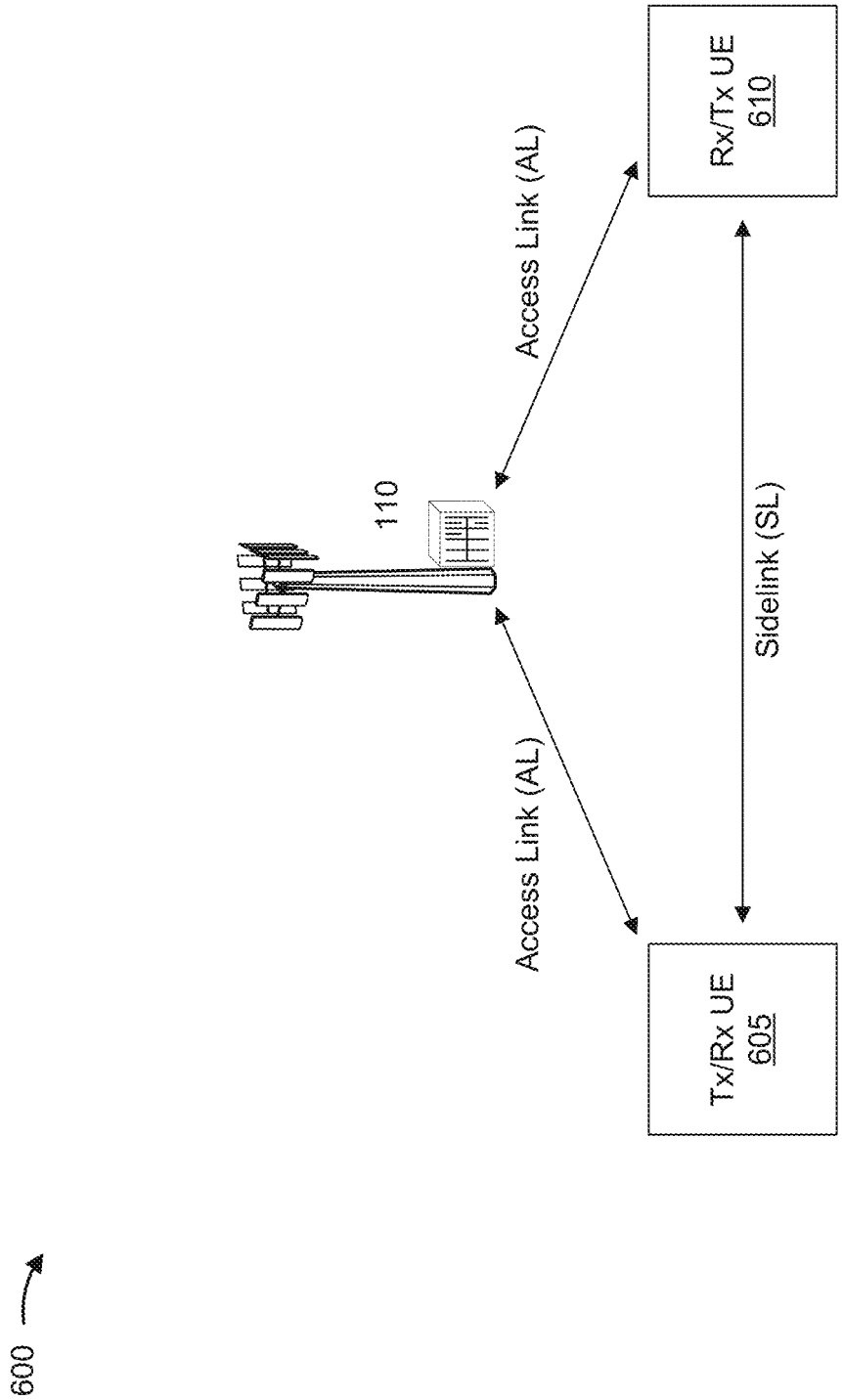
FIG. 6 is a diagram illustrating an example of sidelink communications and access link communications, in accordance with various aspects of the present disclosure.

FIG. 6 is a diagram illustrating an example 600 of sidelink communications and access link communications, in accordance with various aspects of the present disclosure.

As shown in FIG. 6, a transmitter (Tx)/receiver (Rx) UE 605 and an Rx/Tx UE 610 may communicate with one another via a sidelink, as described above in connection with FIG. 5. As further shown, in some sidelink modes, a base station 110 may communicate with the Tx/Rx UE 605 via a first access link. Additionally, or alternatively, in some sidelink modes, the base station 110 may communicate with the Rx/Tx UE 610 via a second access link. The Tx/Rx UE 605 and/or the Rx/Tx UE 610 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 6 is provided as an example. Other examples may differ from what is described with respect to FIG. 6.

Vehicle-to-everything (V2X) communication is an umbrella term that generally refers to technologies that can be used to communicate information between a vehicle equipped with suitable communication capabilities and one or more other devices. For example, V2X communication may include vehicle-to-vehicle (V2V) communication technologies that allow vehicles to communicate with one another (e.g., to support safety systems with non-line-of-sight and latency-sensitive collision avoidance capabilities), vehicle-to-pedestrian (V2P) communication technologies that allow vehicles to communicate with smartphones, connected wearable devices, and/or the like, vehicle-to-infrastructure (V2I) communication technologies that allow vehicles to communicate with external systems such as street lights, buildings, roadside units, and/or the like, vehicle-to-network (V2N) communication technologies that allow vehicles to communicate with cellular networks, and/or the like. For example, in 3GPP Release 14, cellular V2X (C-V2X) was initially defined with LTE as an underlying radio access technology (RAT), and in 3GPP Release 15, C-V2X functionality was expanded to provide support for communication using NR as an enabling RAT.

Accordingly, in some cases, a V2X wireless communication system may support one or more protocols (e.g., V2V, V2P, V2I, V2N, and/or the like) that enable UEs to communicate with one another directly using device-to-device communication over a PC5 interface, also known as sidelink communication, without using a base station as an intermediary (e.g., in the 5.9 GHz spectrum dedicated to Intelligent Transport Systems (ITS)). Additionally, or alternatively, in some cases, a V2X wireless communication system may support one or more protocols (e.g., V2N) that enable UEs to communicate with a wireless wide area network (WWAN) and/or other devices in communication with the WWAN over a cellular (e.g., Uu) interface (e.g., over a licensed spectrum and/or an unlicensed spectrum).

In V2X communication systems, one challenge that may arise is that conditions of the sidelink, uplink, downlink, and/or other suitable communication channels used to carry V2X communications can vary widely and change quickly. For example, the channel conditions may vary and/or change due to the high mobility of vehicles and UEs associated with the vehicles, large variations in vehicle traffic at different times of day and/or in different locations, wide variation in topographies that the vehicles may traverse (e.g., dense urban environments, hilly environments, flat environments, and/or the like), and/or the like. Furthermore, V2X communication systems need to be highly reliable due to mission critical safety issues associated with, for example, autonomous vehicles and protecting vulnerable road users (e.g., pedestrians, cyclists, motorcyclists, or other road users that have little or no protection that would absorb energy in a collision). Accordingly, because road safety is an important concern in V2X environments, V2X environments generally need to have efficient paging mechanisms to enable devices to inform other devices about safety risks, such as a pedestrian UE following a potential collision course.

Furthermore, another challenge that may arise in a V2X communication system relates to power consumption associated with certain devices (e.g., battery-powered UEs, such as smartphones, smart watches, and/or the like), imbalanced power budgets for different device types (e.g., a pedestrian UE (P-UE) that operates on battery power may be more power-sensitive than a vehicle UE (V-UE) or an infrastructure device), and/or the like. For example, significant power may be consumed when a device performs operations to sense a resource pool to determine resource availability prior to performing a transmission (e.g., to announce presence, transmit a safety alert, and/or the like). This may lead to battery depletion, which may create safety risks and/or degraded user experience, because a device may be unable to receive V2X messages from other devices, may be unable to transmit V2X messages to other devices, and/or the like.

Some aspects described herein relate to techniques and apparatuses to provide sidelink resource selection assistance and paging (e.g., in a V2X environment). For example, in some aspects, an assisting UE (e.g., a V-UE and/or the like) that operates in an always-on mode or otherwise has a substantial power budget may provide sidelink signaling that includes resource assistance information, a sidelink wakeup signal, and/or the like to an assisted UE (e.g., a P-UE and/or the like) that has a limited power budget, periodically transitions between active and low-power modes to reduce power consumption, and/or the like. For example, in some aspects, the assisting UE may measure one or more sidelink channels (e.g., sidelink resource pools that include time and frequency resources allocated to transmissions from the assisting UE, the assisted UE, and/or the like) to obtain the resource assistance information, which may include one or more measurements that relate to congestion and/or other conditions associated with the sidelink channels based at least in part on control information that indicates channel availability, a channel busy ratio (CBR) that indicates a proportion of channel time where energy measured on the channel is above a threshold, and/or the like.

Accordingly, in some aspects, the assisting UE may transmit the sidelink signaling that includes the resource assistance information, the sidelink wakeup signal, and/or the like to the assisted UE, which may then use the resource assistance information, the sidelink wakeup signal, and/or the like to perform one or more transmit and/or receive operations. For example, the assisted UE may use the resource assistance information to select a time and frequency resource (e.g., a physical resource block (PRB)) within a sidelink resource pool to be used for a transmission by the assisted UE. Additionally, or alternatively, the sidelink wakeup signal may indicate that an upcoming transmission (e.g., a safety message) is scheduled in a resource pool allocated to transmissions by the assisting UE, whereby the assisted UE may schedule reception of the upcoming transmission by the assisting UE. In this way, the assisted UE may be provided with the resource assistance information to enable the assisted UE to select a suitable transmission resource without having to perform sensing operations to determine sidelink channel conditions prior to performing a transmission, which may enable the assisted UE to enter a low-power state or otherwise conserve power during times when the assisted UE would otherwise be measuring sidelink channel conditions. Furthermore, by including the sidelink wakeup signal in the sidelink signaling, the assisting UE may efficiently page the assisted UE in cases where there is an important transmission that the assisted UE is to receive, which may improve road safety, provide an improved user experience, and/or the like.

Figure 7A:
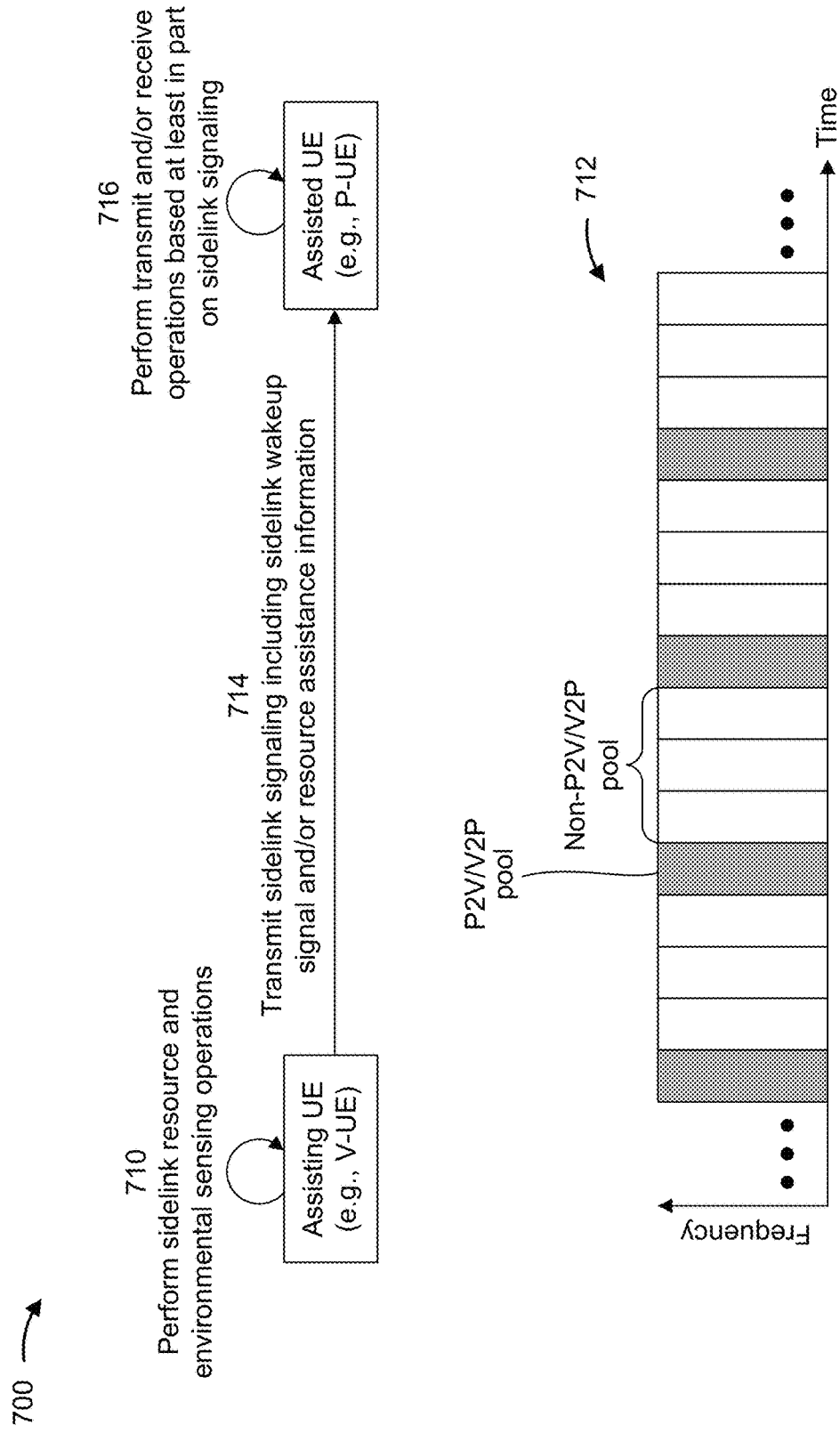
FIGS. 7A-7C are diagrams illustrating one or more examples of sidelink resource selection assistance and paging, in accordance with various aspects of the present disclosure.
Figure 7B:
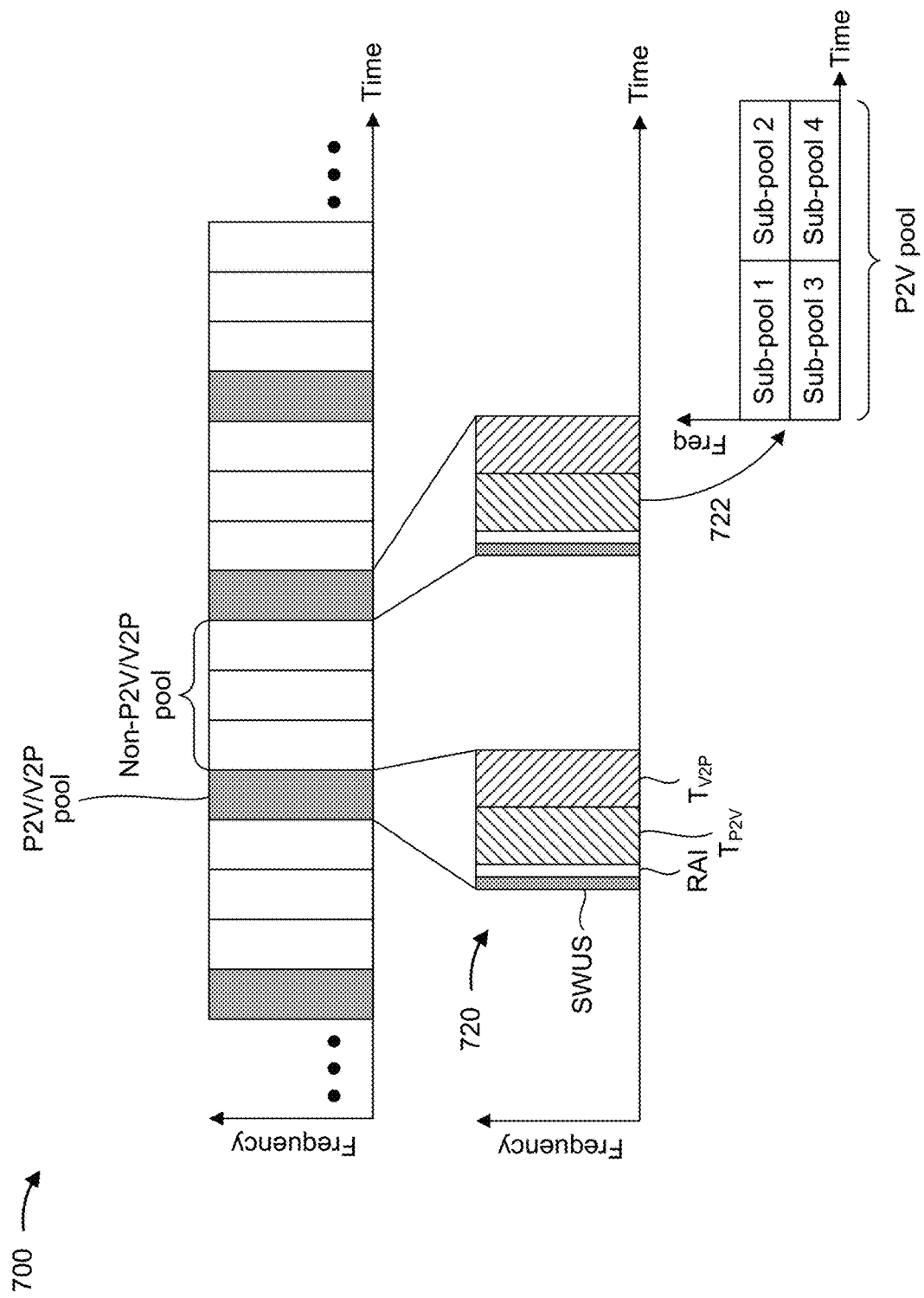
Figure 7C:
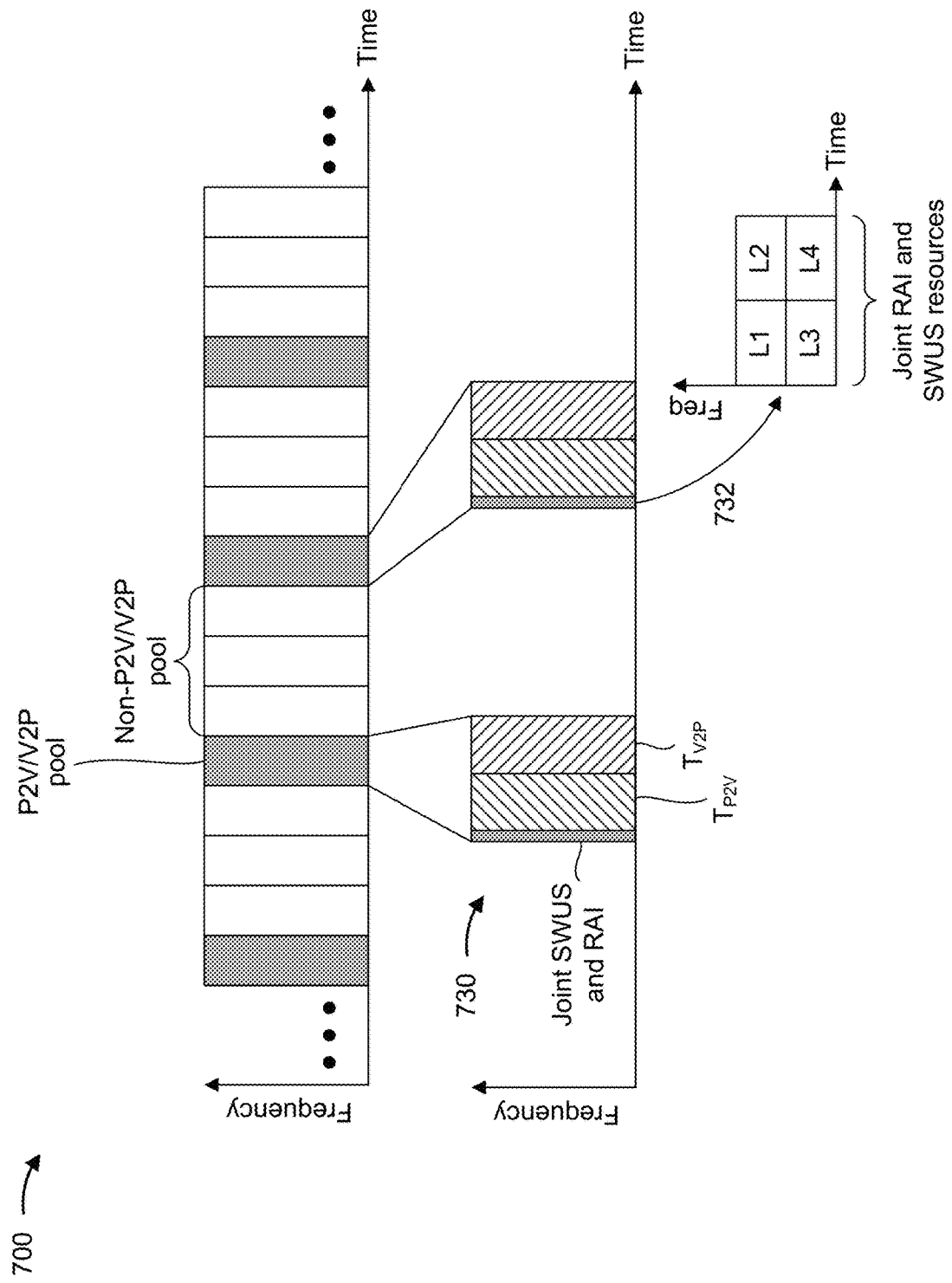

FIGS. 7A-7C are diagrams illustrating one or more examples 700 of sidelink resource selection assistance and paging, in accordance with various aspects of the present disclosure. As shown in FIG. 7A, example(s) 700 include an assisting UE and an assisted UE that may be in communication over a sidelink. Furthermore, as shown in FIGS. 7B-7C, the assisting UE and the assisted UE may communicate over the sidelink using one or more resource pools that include time and frequency resources allocated to transmissions to and/or from the assisting UE, the assisted UE, and/or the like. For example, in some aspects, the assisting UE may be a vehicle UE (V-UE) that may operate in an always-on mode, have a substantial power budget, and/or the like, and the assisting UE may use the resource pools that include the time and frequency resources allocated to transmissions to and/or from the assisting UE to transmit sidelink signaling that includes resource selection assistance and/or paging information to the assisted UE, which may be a pedestrian UE (P-UE) that has a limited power budget, periodically transitions between active and low-power modes to reduce power consumption, and/or the like. Additionally, or alternatively, the assisting UE and/or the assisted UE may be other suitable UEs that communicate on a sidelink (e.g., in a V2X environment or another suitable environment that utilizes sidelink communications). Accordingly, while some aspects may be described herein with reference to vehicle-to-pedestrian (V2P) and/or pedestrian-to-vehicle (P2V) communications, aspects described herein may also be applicable to other suitable sidelink communications.

As shown in FIG. 7A, and by reference number 710, the assisting UE may perform sidelink and environmental sensing operations. For example, in some aspects, the assisting UE may measure one or more sidelink channels (e.g., sidelink resource pools that include time and frequency resources allocated to transmissions from the assisting UE, the assisted UE, and/or the like) to obtain one or more measurements associated with the sidelink channels. For example, in some aspects, the assisting UE may measure energy levels on the sidelink channels to determine a CBR that indicates a proportion of time (e.g., within a sensing window) during which the measured energy levels on the sidelink channels are above a threshold. Additionally, or alternatively, the assisting UE may obtain other suitable measurements that may relate to channel congestion and/or other conditions associated with the one or more sidelink channels, such as a received signal strength indicator (RSSI) parameter (e.g., a sidelink-RSSI (S-RSSI) parameter), a reference signal received power (RSRP) parameter (e.g., a physical sidelink shared channel (PSSCH)-RSRP parameter), a reference signal received quality (RSRQ) parameter (e.g., a PSSCH-RSRQ parameter), and/or the like. Furthermore, in some aspects, the assisting UE may obtain a bit map indicating the availability of resources that the assisted UE can use to transmit. For example, if there are N subchannels that the assisted UE is allowed to use for transmission, the assisting UE can provide a bit map of length N to indicate whether each individual subchannel is available to use for transmission (e.g., where there are five subchannels that the assisted UE can use to transmit, a bitmap of [00111] may indicate that the first two subchannels are unavailable for transmission based on '0' having a meaning that the corresponding resources are already occupied, while the last three subchannels are available for the assisted UE to transmit based on '1' having a meaning that the corresponding resources are available).

Furthermore, in some aspects, the assisting UE may perform environmental sensing operations. For example, the assisting UE may identify the presence, location, velocity, travel direction, and/or the like for one or more vehicles in a surrounding environment; the presence, location, velocity, travel direction, and/or the like for the assisted UE; and/or the like. Additionally, or alternatively, in some aspects, the assisting UE may determine information related to traffic infrastructure, such as the state(s) associated with one or more traffic signals, lane markings, road signs, and/or the like. In this way, the assisting UE may sense environmental conditions that may satisfy a condition to page or otherwise alert the assisted UE (e.g., when the assisted UE may be at risk of a collision based at least in part on the locations and/or movements (e.g., velocities, travel directions, and/or the like) for the assisted UE and/or other objects or devices in the surrounding environment).

As further shown in FIG. 7A, and by reference number 712, the assisting UE may perform the sidelink resource and environmental sensing operations during one or more time periods that are outside a resource pool that includes time and frequency resources allocated to transmissions from the assisting UE to the assisted UE, from the assisted UE to the assisting UE, and/or the like. For example, in cases where the assisting UE and the assisted UEs respectively correspond to a V-UE and a P-UE communicating in a V2X environment, communications in the V2X environment may include various resource pools that are used for different communication protocols. For example, as shown, communications in the V2X environment may include one or more resource pools that are allocated to P2V and/or V2P communications, which may be time division multiplexed (TMDed) with non-P2V/V2P resource pools (e.g., resource pools for V2V communications, V2N communications, V2I communications, and/or the like). Accordingly, in cases where the assisting UE is a V-UE and the assisted UE is a P-UE, the assisting UE may perform the sidelink resource and environmental sensing operations, and the assisted UE may enter a low-power state during the non-P2V/V2P resource pools.

As further shown in FIG. 7A, and by reference number 714, the assisting UE may transmit, and the assisted UE may receive, sidelink signaling that includes a sidelink wakeup signal and/or resource assistance information. For example, as described in further detail below, the P2V/V2P resource pool may include one or more physical resource blocks (PRBs) that precede a P2V resource pool that includes time and frequency resources allocated to transmissions from P-UEs to V-UEs and a V2P resource pool that includes time and frequency resources allocated to transmissions from V-UEs to P-UEs. Accordingly, in some aspects, the assisting UE may transmit the sidelink signaling that includes the resource assistance information and/or the sidelink wakeup signal in the one or more PRBs that precede the P2V resource pool and the V2P resource pool. Furthermore, as described in more detail below, the sidelink signaling may include the resource assistance information only, separate transmissions of the resource assistance information and the sidelink wakeup signal, a joint transmission of the resource assistance information and the sidelink wakeup signal, and/or the like.

As further shown in FIG. 7A, and by reference number 716, the assisted UE may perform one or more transmit and/or receive operations based at least in part on the sidelink signaling. For example, when the assisted UE intends to transmit (e.g., to announce presence, location, velocity, travel direction, and/or the like), the assisted UE may select a resource to be used for the transmission based on the resource assistance information included in the sidelink signaling. Furthermore, in cases where the sidelink signaling includes a sidelink wakeup signal to indicate that there are one or more upcoming transmissions to be received by the assisted UE (e.g., a V2P transmission, such as a safety alert), the assisted UE may schedule reception of the one or more upcoming transmissions. In this way, the assisted UE may refrain from performing sensing operations prior to performing a sidelink transmission, which may conserve power resources associated with the assisted UE. Furthermore, by providing the assisted UE with a sidelink wakeup signal to indicate when there are one or more upcoming transmissions to be received by the assisted UE, the assisting UE may efficiently page the assisted UE when there are mission-critical or other important messages to be received by the assisted UE (e.g., when the assisted UE is on a collision course). Additionally, or alternatively, in cases where the assisting UE does not provide a sidelink wakeup signal, the assisted UE may stay in a low-power mode rather than transitioning into an active mode to monitor a sidelink channel and/or the like. Furthermore, in some aspects, the assisted UE may wake up to receive the resource assistance information (from the assisting UE) before the assisted UE attempts to transmit regardless of whether the assisting UE provides a sidelink wakeup signal.

As shown in FIG. 7B, and by reference number 720, the P2V/V2P resource pool may include a P2V pool ($T_{P2V}$) that includes time and frequency resources allocated to P2V transmissions, a V2P pool ($T_{V2P}$) that includes time and frequency resources allocated to V2P transmissions, and separate resource pools (e.g., slots, PRBs, and/or the like) for a sidelink wakeup signal and resource assistance information. As shown in FIG. 7B, the resource pools for the sidelink wakeup signal and the resource assistance information may generally precede the P2V pool and the V2P pool. Furthermore, when the assisting UE separately transmits both the resource assistance information and the sidelink wakeup signal, the resource assistance information may be transmitted in one or more slots, PRBs, and/or the like after the sidelink wakeup signal and prior to the P2V and V2P pools, and the slots, PRBs, and/or the like used to transmit the resource assistance information and/or the sidelink wakeup signal may be selected by the assisting UE randomly, based at least in part on the sensed sidelink channel conditions, and/or the like. In some aspects, time and frequency resources (e.g., in terms of slots and/or PRBs) may be preconfigured for the resource assistance information, and the preconfigured time and frequency resources for the resource assistance information may be defined according to a slot offset, a PRB offset, and/or the like with respect to time and frequency resources reserved, preconfigured, or otherwise allocated to the sidelink wakeup signal. Furthermore, although FIG. 7B illustrates the P2V pool as preceding the V2P pool, in some aspects, the V2P pool may precede the P2V pool.

In some aspects, when the resources allocated to the sidelink signaling include separate resources for the resource assistance information and the sidelink wakeup signal, the assisting UE may transmit the sidelink wakeup signal only when there are one or more V2P transmissions to be received by the assisted UE (e.g., the assisting UE may refrain from transmitting the sidelink wakeup signal to a P-UE that is traveling on the sidewalk a safe distance away from any vehicles). However, the assisting UE may always transmit the resource assistance information to enable the assisted UE to select a suitable resource to perform a P2V transmission. Accordingly, in some cases, the assisted UE may refrain from decoding the resource assistance information in cases where the assisted UE does not intend to initiate a P2V transmission. For example, if the assisted UE does not intend to initiate a P2V transmission, the assisted UE generally does not need to select a suitable transmission resource and may therefore refrain from decoding the resource assistance information in such cases. In some aspects, the assisted UE may refrain from decoding the resource assistance information in any P2V/V2P occasion in which the assisted UE does not intend to transmit, or the assisted UE may refrain from decoding the resource assistance information only when a sidelink wakeup signal is not detected. For example, in cases where a sidelink wakeup signal is detected to announce an upcoming safety alert, the assisted UE may decode the resource assistance information to select a resource to send a P2V transmission acknowledging the sidelink wakeup signal, to provide updated information related to the location and/or movement of the assisted UE, and/or the like.

As further shown in FIG. 7B, and by reference number 722, the resource pool allocated to transmissions by the assisted UE (e.g., a P2V pool) may divided into one or more sub-pools, and the assisting UE may configure the resource assistance information associated with the P2V pool, the one or more sub-pools, and/or the like to provide the resource assistance information at different levels of granularity. For example, in some aspects, the resource assistance information may include a coarse CBR for the entire P2V pool, which may be represented as a value in a range from zero to one to indicate a proportion of time when measured energy in the P2V pool satisfies a threshold. Additionally, or alternatively, the resource assistance information may include a CBR associated with each individual sub-pool in the P2V pool, which may provide the assisted UE with more granular information to be used to select a resource for a P2V transmission. For example, if the CBR for the entire P2V pool has a value of 0.7, the assisted UE may determine that the P2V pool is congested and defer transmissions, increase a transmit power, and/or the like. However, in an example where the P2V pool includes four sub-pools, with three sub-pools having a CBR of 0.8 and a fourth sub-pool having a CBR of 0.4 (equivalent to a coarse CBR of 0.7 for the entire P2V pool), the more granular CBR provided per sub-pool may enable the assisted UE to select the fourth sub-pool that is relatively uncongested. Furthermore, in some aspects, the assisting UE may provide a full resource map of the entire P2V pool (e.g., a CBR per resource block and/or the like), which may provide further granularity in the information that the assisting UE can use to select a P2V resource. For example, in some aspects, the full resource map may include a detailed bit map that the assisting UE provides to indicate the availability of resources that the assisted UE can use to transmit. For example, if a pool configuration for the assisted UE includes N subchannels that the assisted UE is allowed to use for transmission, the assisting UE can provide a bit map of length N to indicate whether each individual subchannel in the pool configuration for the assisted UE is available to use for transmission (e.g., where there are five subchannels that the assisted UE can use to transmit, a bitmap of [00111] may indicate that the first two subchannels are unavailable for transmission based on '0' having a meaning that the corresponding resources are already occupied, while the last three subchannels are available for the assisted UE to transmit based on '1' having a meaning that the corresponding resources are available). In this way, the detailed bit map may provide further granularity in the information that the assisting UE can use to select a suitable P2V resource to be used for a transmission.

As shown in FIG. 7C, and by reference number 730, another configuration for the P2V/V2P resource pool may include a P2V pool ($T_{P2V}$) for P2V transmissions, a V2P pool ($T_{V2P}$) for V2P transmissions, and a resource pool that includes time and frequency resources (e.g., slots, PRBs, and/or the like) in which a sidelink wakeup signal and resource assistance information can be jointly transmitted. As shown in FIG. 7C, the resource pool for the joint transmission of the sidelink wakeup signal and the resource assistance information may precede the P2V pool and the V2P pool. Furthermore, although FIG. 7C illustrates the P2V pool as preceding the V2P pool, in some aspects, the V2P pool may precede the P2V pool.

In some aspects, in order to jointly transmit the sidelink wakeup signal and the resource assistance information, there may be N preconfigured sequences $\{s_1, s_2, \ldots S_N\}$ that can be used to indicate a particular combination of sidelink parameters (e.g., sidelink wakeup signal and resource assistance information). In general, each of the N preconfigured sequences may be a unique sequence, such as a Zadoff-Chu sequence, to jointly indicate the presence of the sidelink wakeup signal and one or more parameters for the resource assistance information. For example, the assisting UE may transmit a first preconfigured sequence, $s_1$, to jointly indicate the presence of the sidelink wakeup signal and indicate that the CBR for the entire P2V pool is in a range from [a, b], where a, b $\in$ [0, 1] with a≤b. In another example, the assisting UE may transmit a second preconfigured sequence, $s_2$, to jointly indicate the presence of the sidelink wakeup signal and indicate that a first sub-pool has a CBR in a range from $[a_1, b_1]$ and a second sub-pool has a CBR in a range from $[a_2, b_2]$, where $a_i$, $b_i$(i=1, 2) $\in$ [0, 1] with $a_i \leq b_i$. In still another example, the assisting UE may transmit a third sequence, $s_3$, to jointly indicate the presence of the sidelink wakeup signal and indicate that a particular sub-pool has a CBR in a range from $[a_1, b_1]$ and the entire P2V pool has a CBR in a range from $[a_2, b_2]$, where $a_i$, $b_i$(i=1, 2) $\in$ [0, 1] with $a_i \leq b_i$. Accordingly, in some aspects, the assisting UE may select a sequence to be transmitted based at least in part on the sensed channel conditions (e.g., the CBR associated with the entire P2V pool, one or more sub-pools, and/or the like) in cases where the assisting UE intends to jointly indicate the sidelink wakeup signal and the resource assistance information.

Furthermore, in some aspects, the sequences $\{s_1, s_2, \ldots s_N\}$ may be orthogonal to one another, whereby different assisting UEs may transmit different sequences to reflect the sidelink channel conditions sensed by each respective assisting UE. For example, as described above, channel conditions may vary in a sidelink communication system, such as a V2X environment, due to the presence (or absence) of devices at different locations in the environment, among other factors. Accordingly, different assisting UEs may sense different sidelink channel conditions, and configuring the sequences $\{s_1, s_2, \ldots s_N\}$ to be orthogonal to one another may enable different assisting UEs to transmit different sequences to indicate the different sidelink channel conditions without the transmissions of the sequences colliding with one another. For example, in a particular joint sidelink wakeup signal and resource assistance information occasion, a first assisting UE may transmit a first sequence, $s_1$, and a second assisting UE may transmit a second sequence, $s_2$. Accordingly, an assisted UE may receive and decode one or more sequences (e.g., sequence $s_1$ from the first assisting UE and sequence $s_2$ from the second assisting UE) and determine a weighted CBR metric that provides a better estimate of the CBR for resource selection.

As further shown in FIG. 7C, and by reference number 732, the resource pool allocated to the joint transmission of the sidelink wakeup signal and the resource assistance information may include various PRBs, sub-channels, and/or the like in which the sequence(s) jointly indicating the sidelink wakeup signal and the resource assistance information can be transmitted. Accordingly, in some aspects, the assisting UE may randomly select a particular resource to transmit a sequence jointly indicating the sidelink wakeup signal and the resource assistance information, or the assisting UE may select the resource to transmit the sequence based at least in part on the sensed sidelink channel conditions. Additionally, or alternatively, in some aspects, the one or more PRBs, sub-channels, and/or the like in which the sequence can be transmitted may be frequency division multiplexed (FDMed), whereby a resource that is used to transmit a sequence may implicitly indicate the meaning of the sequence. For example, if the assisting UE transmits a particular sequence (e.g., sequence $s_1$) using a first PRB (e.g., resource $L_2$), the transmission of the sequence within the first PRB may jointly indicate a sidelink wakeup signal and a sensed CBR in a range from $[a_1, b_1]$, where $a_1, b_1 \in [0, 1]$ with $a_1 \leq b_1$. However, if the assisting UE transmits the same sequence using a second PRB (e.g., resource $L_3$), the transmission of the sequence within the second PRB may jointly indicate a sidelink wakeup signal and a sensed CBR in a range from $[a_2, b_2]$, where $a_2, b_2 \in [0, 1]$ with $a_2 \leq b_2$ and with $a_1 \neq a_2$ and/or $b_1 \neq b_2$.

As indicated above, FIGS. 7A-7C are provided as one or more examples. Other examples may differ from what is described with respect to FIGS. 7A-7C.

FIG. 8 is a diagram illustrating an example process 800 performed, for example, by a UE, in accordance with various aspects of the present disclosure. Example process 800 is an example where a UE (e.g., UE 120, UE 505-1 and/or 505-2, Tx/Rx UE 605, Rx/Tx UE 610, assisting UE in FIG. 7A, and/or the like) performs operations associated with sidelink resource selection assistance and paging.

As shown in FIG. 8, in some aspects, process 800 may include obtaining one or more measurements associated with a sidelink resource pool that includes one or more time and frequency resources allocated to sidelink transmissions to or from the UE (block 810). For example, the UE may obtain (e.g., using antenna 252, DEMOD 254, MIMO detector 256, receive processor 258, controller/processor 280, memory 282, and/or the like) one or more measurements associated with a sidelink resource pool that includes one or more time and frequency resources allocated to sidelink transmissions to or from the UE, as described above.

As further shown in FIG. 8, in some aspects, process 800 may include transmitting sidelink signaling to an assisted UE, wherein the sidelink signaling includes signaling to wake up the assisted UE and resource assistance information indicating the one or more measurements associated with the sidelink resource pool (block 820). For example, the UE may transmit (e.g., using controller/processor 280, transmit processor 264, TX MIMO processor 266, MOD 254, antenna 252, and/or the like) sidelink signaling to an assisted UE, as described above. In some aspects, the sidelink signaling includes signaling to wake up the assisted UE and resource assistance information indicating the one or more measurements associated with the sidelink resource pool.

Process 800 may include additional aspects, such as any single aspect or any combination of aspects described below and/or in connection with one or more other processes described elsewhere herein.

In a first aspect, the resource assistance information is transmitted in one or more PRBs prior to the sidelink resource pool that includes the one or more time and frequency resources allocated to the sidelink transmissions to or from the UE.

In a second aspect, alone or in combination with the first aspect, the signaling to wake up the assisted UE includes a sidelink wakeup signal transmitted separately from the resource assistance information.

In a third aspect, alone or in combination with one or more of the first and second aspects, the resource assistance information is transmitted in one or more PRBs after the sidelink wakeup signal and prior to the sidelink resource pool that includes the one or more time and frequency resources allocated to the sidelink transmissions to or from the UE.

In a fourth aspect, alone or in combination with one or more of the first through third aspects, the one or more PRBs in which the resource assistance information is transmitted have a preconfigured offset from one or more PRBs in which the sidelink wakeup signal is transmitted.

In a fifth aspect, alone or in combination with one or more of the first through fourth aspects, the one or more measurements associated with the sidelink resource pool include a coarse CBR associated with the sidelink resource pool.

In a sixth aspect, alone or in combination with one or more of the first through fifth aspects, the sidelink resource pool includes one or more sub-pools, and the one or more measurements associated with the sidelink resource pool include a respective CBR associated with each of the one or more sub-pools.

In a seventh aspect, alone or in combination with one or more of the first through sixth aspects, the one or more measurements associated with the sidelink resource pool include a granular resource map associated with the sidelink resource pool.

In an eighth aspect, alone or in combination with one or more of the first through seventh aspects, the sidelink signaling includes a sequence to jointly indicate a sidelink wakeup signal and the resource assistance information.

In a ninth aspect, alone or in combination with one or more of the first through eighth aspects, the sequence indicates a range for a coarse CBR associated with the sidelink resource pool.

In a tenth aspect, alone or in combination with one or more of the first through ninth aspects, the sidelink resource pool includes one or more sub-pools, and the sequence indicates one or more of a range for a coarse CBR associated with the sidelink resource pool or a range for a CBR associated with at least one of the one or more sub-pools.

In an eleventh aspect, alone or in combination with one or more of the first through tenth aspects, the sequence indicates one or more of the range for the coarse CBR associated with the sidelink resource pool or the range for the CBR associated with the at least one of the one or more sub-pools based at least in part on a PRB in which the sequence is transmitted.

In a twelfth aspect, alone or in combination with one or more of the first through eleventh aspects, the sequence is one of a plurality of preconfigured sequences that are orthogonal with respect to one another.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with various aspects of the present disclosure. Example process 900 is an example where a UE (e.g., UE 120, UE 505-1 and/or 505-2, Tx/Rx UE 605, Rx/Tx UE 610, assisted UE in FIG. 7A, and/or the like) performs operations associated with sidelink resource selection assistance and paging.

As shown in FIG. 9, in some aspects, process 900 may include receiving, from an assisting UE, sidelink signaling that includes signaling to wake up the UE and resource assistance information indicating one or more measurements associated with a sidelink resource pool that includes one or more time and frequency resources allocated to sidelink transmissions to or from the UE (block 910). For example, the UE may receive (e.g., using antenna 252, DEMOD 254, MIMO detector 256, receive processor 258, controller/processor 280, memory 282, and/or the like), from an assisting UE, sidelink signaling that includes signaling to wake up the UE and resource assistance information indicating one or more measurements associated with a sidelink resource pool that includes one or more time and frequency resources allocated to sidelink transmissions to or from the UE, as described above.

As further shown in FIG. 9, in some aspects, process 900 may include performing one or more transmit or receive operations based at least in part on the sidelink signaling (block 920). For example, the UE may perform (e.g., using antenna 252, DEMOD 254, MIMO detector 256, receive processor 258, controller/processor 280, memory 282, transmit processor 264, TX MIMO processor 266, MOD 254, and/or the like) one or more transmit or receive operations based at least in part on the sidelink signaling, as described above.

Process 900 may include additional aspects, such as any single aspect or any combination of aspects described below and/or in connection with one or more other processes described elsewhere herein.

In a first aspect, the resource assistance information is received in one or more PRBs prior to the sidelink resource pool that includes the one or more time and frequency resources allocated to the sidelink transmissions to or from the UE.

In a second aspect, alone or in combination with the first aspect, the signaling to wake up the UE includes a sidelink wakeup signal transmitted separately from the resource assistance information.

In a third aspect, alone or in combination with one or more of the first and second aspects, the resource assistance information is received in one or more PRBs after the sidelink wakeup signal and prior to the sidelink resource pool that includes the one or more time and frequency resources allocated to the sidelink transmissions to or from the UE.

In a fourth aspect, alone or in combination with one or more of the first through third aspects, the one or more PRBs in which the resource assistance information is received have a preconfigured offset from one or more PRBs in which the sidelink wakeup signal is received.

In a fifth aspect, alone or in combination with one or more of the first through fourth aspects, the one or more measurements associated with the sidelink resource pool include a coarse CBR associated with the sidelink resource pool.

In a sixth aspect, alone or in combination with one or more of the first through fifth aspects, the sidelink resource pool includes one or more sub-pools, and the one or more measurements associated with the sidelink resource pool include a respective CBR associated with each of the one or more sub-pools.

In a seventh aspect, alone or in combination with one or more of the first through sixth aspects, the one or more measurements associated with the sidelink resource pool include a granular resource map associated with the sidelink resource pool.

In an eighth aspect, alone or in combination with one or more of the first through seventh aspects, the sidelink signaling includes a sequence to jointly indicate a sidelink wakeup signal and the resource assistance information.

In a ninth aspect, alone or in combination with one or more of the first through eighth aspects, the sequence indicates a range for a coarse CBR associated with the sidelink resource pool.

In a tenth aspect, alone or in combination with one or more of the first through ninth aspects, the sidelink resource pool includes one or more sub-pools, and the sequence indicates one or more of a range for a coarse CBR associated with the sidelink resource pool or a range for a CBR associated with at least one of the one or more sub-pools.

In an eleventh aspect, alone or in combination with one or more of the first through tenth aspects, the sequence indicates one or more of the range for the coarse CBR associated with the sidelink resource pool or the range for the CBR associated with the at least one of the one or more sub-pools based at least in part on a PRB in which the sequence is transmitted.

In a twelfth aspect, alone or in combination with one or more of the first through eleventh aspects, the sequence is one of a plurality of preconfigured sequences that are orthogonal with respect to one another.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of aspects of the present disclosure:

Aspect 1: A method of wireless communication performed by a UE, comprising: obtaining one or more measurements associated with a sidelink resource pool that includes one or more time and frequency resources allocated to sidelink transmissions to or from the UE; and transmitting sidelink signaling to an assisted UE, wherein the sidelink signaling includes signaling to wake up the assisted UE and resource assistance information indicating the one or more measurements associated with the sidelink resource pool.

Aspect 2: The method of aspect 1, wherein the resource assistance information is transmitted in one or more PRBs prior to the sidelink resource pool that includes the one or more time and frequency resources allocated to the sidelink transmissions to or from the UE.

Aspect 3: The method of any of aspects 1 through 2, wherein the signaling to wake up the assisted UE includes a sidelink wakeup signal transmitted separately from the resource assistance information.

Aspect 4: The method of any of aspects 1 through 3, wherein the resource assistance information is transmitted in one or more PRBs after the sidelink wakeup signal and prior to the sidelink resource pool that includes the one or more time and frequency resources allocated to the sidelink transmissions to or from the UE.

Aspect 5: The method of any of aspects 1 through 4, wherein the one or more PRBs in which the resource assistance information is transmitted have a preconfigured offset from one or more PRBs in which the sidelink wakeup signal is transmitted.

Aspect 6: The method of any of aspects 1 through 5, wherein the one or more measurements associated with the sidelink resource pool include a coarse CBR associated with the sidelink resource pool.

Aspect 7: The method of any of aspects 1 through 6, wherein the sidelink resource pool includes one or more sub-pools, and wherein the one or more measurements associated with the sidelink resource pool include a respective CBR associated with each of the one or more sub-pools.

Aspect 8: The method of any of aspects 1 through 5 or 7, wherein the one or more measurements associated with the sidelink resource pool include a granular resource map associated with the sidelink resource pool.

Aspect 9: The method of any of aspects 1 through 8, wherein the sidelink signaling includes a sequence to jointly indicate a sidelink wakeup signal and the resource assistance information.

Aspect 10: The method of aspect 9, wherein the sequence indicates a range for a coarse CBR associated with the sidelink resource pool.

Aspect 11: The method of any of aspects 9 through 10, wherein the sidelink resource pool includes one or more sub-pools, and wherein the sequence indicates one or more of a range for a coarse CBR associated with the sidelink resource pool or a range for a CBR associated with at least one of the one or more sub-pools.

Aspect 12: The method of aspect 11, wherein the sequence indicates one or more of the range for the coarse CBR associated with the sidelink resource pool or the range for the CBR associated with the at least one of the one or more sub-pools based at least in part on a PRB in which the sequence is transmitted.

Aspect 13: The method of any of aspects 9 through 12, wherein the sequence is one of a plurality of preconfigured sequences that are orthogonal with respect to one another.

Aspect 14: An apparatus for wireless communication, comprising a memory; and one or more processors operatively coupled to the memory, the memory and the one or more processors configured to perform the method of any of aspects 1-13.

Aspect 15: A non-transitory computer-readable medium storing one or more instructions for wireless communication, the one or more instructions comprising one or more instructions that, when executed by one or more processors of a device, cause the device to perform the method of any of aspects 1-13.

Aspect 16: An apparatus for wireless communication, comprising at least one means for performing the method of any of aspects 1-13.

Aspect 17: A method of wireless communication performed by a UE, comprising: receiving, from an assisting UE, sidelink signaling that includes signaling to wake up the UE and resource assistance information indicating one or more measurements associated with a sidelink resource pool that includes one or more time and frequency resources allocated to sidelink transmissions to or from the UE; and performing one or more transmit or receive operations based at least in part on the sidelink signaling.

Aspect 18: The method of aspect 17, wherein the resource assistance information is received in one or more PRBs prior to the sidelink resource pool that includes the one or more time and frequency resources allocated to the sidelink transmissions to or from the UE.

Aspect 19: The method of any of aspects 17 through 18, wherein the signaling to wake up the UE includes a sidelink wakeup signal transmitted separately from the resource assistance information.

Aspect 20: The method of any of aspects 17 through 19, wherein the resource assistance information is received in one or more PRBs after the sidelink wakeup signal and prior to the sidelink resource pool that includes the one or more time and frequency resources allocated to the sidelink transmissions to or from the UE.

Aspect 21: The method of any of aspects 17 through 20, wherein the one or more PRBs in which the resource assistance information is received have a preconfigured offset from one or more PRBs in which the sidelink wakeup signal is received.

Aspect 22: The method of any of aspects 17 through 21, wherein the one or more measurements associated with the sidelink resource pool include a coarse CBR associated with the sidelink resource pool.

Aspect 23: The method of any of aspects 17 through 22, wherein the sidelink resource pool includes one or more sub-pools, and wherein the one or more measurements associated with the sidelink resource pool include a respective CBR associated with each of the one or more sub-pools.

Aspect 24: The method of any of aspects 17 through 21 or 23, wherein the one or more measurements associated with the sidelink resource pool include a granular resource map associated with the sidelink resource pool.

Aspect 25: The method of any of aspects 17 through 24, wherein the sidelink signaling includes a sequence to jointly indicate a sidelink wakeup signal and the resource assistance information.

Aspect 26: The method of aspect 25, wherein the sequence indicates a range for a coarse CBR associated with the sidelink resource pool.

Aspect 27: The method of any of aspects 25 through 26, wherein the sidelink resource pool includes one or more sub-pools, and wherein the sequence indicates one or more of a range for a coarse CBR associated with the sidelink resource pool or a range for a CBR associated with at least one of the one or more sub-pools.

Aspect 28: The method of aspect 27, wherein the sequence indicates one or more of the range for the coarse CBR associated with the sidelink resource pool or the range for the CBR associated with the at least one of the one or more sub-pools based at least in part on a PRB in which the sequence is transmitted.

Aspect 29: The method of any of aspects 25 through 28, wherein the sequence is one of a plurality of preconfigured sequences that are orthogonal with respect to one another.

Aspect 30: An apparatus for wireless communication, comprising a memory; and one or more processors operatively coupled to the memory, the memory and the one or more processors configured to perform the method of any of aspects 17-29.

Aspect 31: A non-transitory computer-readable medium storing one or more instructions for wireless communication, the one or more instructions comprising one or more instructions that, when executed by one or more processors of a device, cause the device to perform the method of any of aspects 17-29.

Aspect 32: An apparatus for wireless communication, comprising at least one means for performing the method of any of aspects 17-29.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   obtaining one or more measurements associated with a sidelink resource pool that includes one or more time and frequency resources allocated to sidelink transmissions to or from the UE; and
   transmitting sidelink signaling to an assisted UE, wherein the sidelink signaling includes a sequence to jointly indicate a wakeup signal to wake up the assisted UE and resource assistance information indicating the one or more measurements associated with the sidelink resource pool.

2. The method of claim 1, wherein the sequence indicates a range for a coarse channel busy ratio (CBR) associated with the sidelink resource pool, wherein the coarse CBR is associated with a level of granularity that is a lower level of granularity relative to a level of granularity associated with a CBR associated with a sub-pool of the sidelink resource pool.

3. The method of claim 1, wherein the sidelink resource pool includes one or more sub-pools, and wherein the sequence indicates one or more of a range for a coarse channel busy ratio (CBR) associated with the sidelink resource pool or a range for a CBR associated with at least one of the one or more sub-pools, wherein the coarse CBR is associated with a level of granularity that is a lower level of granularity relative to a level of granularity associated with the CBR associated with the at least one of the one or more sub-pools.

4. The method of claim 3, wherein the sequence indicates one or more of the range for the coarse CBR associated with the sidelink resource pool or the range for the CBR associated with the at least one of the one or more sub-pools based at least in part on a physical resource block in which the sequence is transmitted.

5. The method of claim 1, wherein the sequence is one of a plurality of preconfigured sequences that are orthogonal with respect to one another.

6. A user equipment (UE) for wireless communication, comprising:
   a memory; and
   one or more processors operatively coupled to the memory, the one or more processors configured to:
     obtain one or more measurements associated with a sidelink resource pool that includes one or more time and frequency resources allocated to sidelink transmissions to or from the UE; and
     transmit sidelink signaling to an assisted UE, wherein the sidelink signaling includes signaling to wake up the assisted UE and resource assistance information indicating the one or more measurements associated with the sidelink resource pool, wherein the signaling to wake up the assisted UE includes a sidelink wakeup signal transmitted separately from the resource assistance information, wherein the resource assistance information is transmitted in one or more physical resource blocks (PRBs) after the sidelink wakeup signal and prior to the sidelink resource pool that includes the one or more time and frequency resources allocated to the sidelink transmissions to or from the UE, wherein the one or more PRBs in which the resource assistance information is transmitted have a preconfigured offset from one or more PRBs in which the sidelink wakeup signal is transmitted.

7. The UE of claim 6, wherein the one or more measurements associated with the sidelink resource pool include a coarse channel busy ratio (CBR) associated with the sidelink resource pool, wherein the coarse CBR is associated with a level of granularity that is a lower level of granularity relative to a level of granularity associated with a CBR associated with a sub-pool of the sidelink resource pool.

8. The UE of claim 6, wherein the sidelink resource pool includes one or more sub-pools, and wherein the one or more measurements associated with the sidelink resource pool include a respective channel busy ratio (CBR) associated with each of the one or more sub-pools.

9. The UE of claim 6, wherein the one or more measurements associated with the sidelink resource pool include a granular resource map associated with the sidelink resource pool, wherein the granular resource map is associated with a level of granularity that is a lower level of granularity relative to a level of granularity associated with a resource map associated with a sub-pool of the sidelink resource pool.

10. A non-transitory computer-readable medium storing one or more instructions for wireless communication, the one or more instructions comprising:
  one or more instructions that, when executed by one or more processors of a user equipment (UE), cause the one or more processors to:
    obtain one or more measurements associated with a sidelink resource pool that includes one or more time and frequency resources allocated to sidelink transmissions to or from the UE; and
    transmit sidelink signaling to an assisted UE, wherein the sidelink signaling includes a sequence to jointly indicate a wakeup signal to wake up the assisted UE and resource assistance information indicating the one or more measurements associated with the sidelink resource pool.

11. The non-transitory computer-readable medium of claim 10, wherein the sequence indicates a range for a coarse channel busy ratio (CBR) associated with the sidelink resource pool, wherein the coarse CBR is associated with a level of granularity that is a lower level of granularity relative to a level of granularity associated with a CBR associated with a sub-pool of the sidelink resource pool.

12. The non-transitory computer-readable medium of claim 10, wherein the sidelink resource pool includes one or more sub-pools, and wherein the sequence indicates one or more of a range for a coarse channel busy ratio (CBR) associated with the sidelink resource pool or a range for a CBR associated with at least one of the one or more sub-pools, wherein the coarse CBR is associated with a level of granularity that is a lower level of granularity relative to a level of granularity associated with the CBR associated with the at least one of the one or more sub-pools.

13. The non-transitory computer-readable medium of claim 12, wherein the sequence indicates one or more of the range for the coarse CBR associated with the sidelink resource pool or the range for the CBR associated with the at least one of the one or more sub-pools based at least in part on a physical resource block in which the sequence is transmitted.

14. The non-transitory computer-readable medium of claim 10, wherein the sequence is one of a plurality of preconfigured sequences that are orthogonal with respect to one another.

15. An apparatus for wireless communication, comprising:
  means for obtaining one or more measurements associated with a sidelink resource pool that includes one or more time and frequency resources allocated to sidelink transmissions to or from the apparatus; and
  means for transmitting sidelink signaling to an assisted UE, wherein the sidelink signaling includes a sequence to jointly indicate a wakeup signal to wake up the assisted UE and resource assistance information indicating the one or more measurements associated with the sidelink resource pool.

16. The apparatus of claim 15, wherein the sequence indicates a range for a coarse channel busy ratio (CBR) associated with the sidelink resource pool, wherein the coarse CBR is associated with a level of granularity that is a lower level of granularity relative to a level of granularity associated with a CBR associated with a sub-pool of the sidelink resource pool.

17. The apparatus of claim 15, wherein the sidelink resource pool includes one or more sub-pools, and wherein the sequence indicates one or more of a range for a coarse channel busy ratio (CBR) associated with the sidelink resource pool or a range for a CBR associated with at least one of the one or more sub-pools, wherein the coarse CBR is associated with a level of granularity that is a lower level of granularity relative to a level of granularity associated with the CBR associated with the at least one of the one or more sub-pools.

18. The apparatus of claim 17, wherein the sequence indicates one or more of the range for the coarse CBR associated with the sidelink resource pool or the range for the CBR associated with the at least one of the one or more sub-pools based at least in part on a physical resource block in which the sequence is transmitted.

19. The apparatus of claim 15, wherein the sequence is one of a plurality of preconfigured sequences that are orthogonal with respect to one another.

20. A method of wireless communication performed by a user equipment (UE), comprising:
  receiving, from an assisting UE, sidelink signaling that includes a sequence to jointly indicate a wakeup signal to wake up the UE and resource assistance information indicating one or more measurements associated with a sidelink resource pool that includes one or more time and frequency resources allocated to sidelink transmissions to or from the UE; and
  performing one or more transmit or receive operations based at least in part on the sidelink signaling.

21. The method of claim 20, wherein the resource assistance information is received in one or more physical resource blocks (PRBs) prior to the sidelink resource pool that includes the one or more time and frequency resources allocated to the sidelink transmissions to or from the UE.

22. The method of claim 20, wherein the sequence indicates a range for a coarse channel busy ratio (CBR) associated with the sidelink resource pool, wherein the coarse CBR is associated with a level of granularity that is a lower level of granularity relative to a level of granularity associated with a CBR associated with a sub-pool of the sidelink resource pool.

23. The method of claim 20, wherein the sidelink resource pool includes one or more sub-pools, and wherein the sequence indicates one or more of a range for a coarse channel busy ratio (CBR) associated with the sidelink resource pool or a range for a CBR associated with at least one of the one or more sub-pools, wherein the coarse CBR is associated with a level of granularity that is a lower level of granularity relative to a level of granularity associated with the CBR associated with the at least one of the one or more sub-pools.

24. The method of claim 23, wherein the sequence indicates one or more of the range for the coarse CBR associated with the sidelink resource pool or the range for the CBR associated with the at least one of the one or more sub-pools based at least in part on a physical resource block in which the sequence is transmitted.

25. The method of claim 20, wherein the sequence is one of a plurality of preconfigured sequences that are orthogonal with respect to one another.

26. A user equipment (UE) for wireless communication, comprising:
a memory; and
one or more processors operatively coupled to the memory, the memory and the one or more processors configured to:
receive, from an assisting UE, sidelink signaling that includes signaling to wake up the UE and resource assistance information indicating one or more measurements associated with a sidelink resource pool that includes one or more time and frequency resources allocated to sidelink transmissions to or from the UE, wherein the signaling to wake up the UE includes a sidelink wakeup signal transmitted separately from the resource assistance information, wherein the resource assistance information is received in one or more physical resource blocks (PRBs) after the sidelink wakeup signal and prior to the sidelink resource pool that includes the one or more time and frequency resources allocated to the sidelink transmissions to or from the UE, wherein the one or more PRBs in which the resource assistance information is received have a preconfigured offset from one or more PRBs in which the sidelink wakeup signal is received; and
perform one or more transmit or receive operations based at least in part on the sidelink signaling.

27. The UE of claim 26, wherein the one or more measurements associated with the sidelink resource pool include a coarse channel busy ratio (CBR) associated with the sidelink resource pool, wherein the coarse CBR is associated with a level of granularity that is a lower level of granularity relative to a level of granularity associated with a CBR associated with a sub-pool of the sidelink resource pool.

28. The UE of claim 26, wherein the sidelink resource pool includes one or more sub-pools, and wherein the one or more measurements associated with the sidelink resource pool include a respective channel busy ratio (CBR) associated with each of the one or more sub-pools.

29. The UE of claim 26, wherein the one or more measurements associated with the sidelink resource pool include a granular resource map associated with the sidelink resource pool, wherein the granular resource map is associated with a level of granularity that is a lower level of granularity relative to a level of granularity associated with a resource map associated with a sub-pool of the sidelink resource pool.

30. A non-transitory computer-readable medium storing one or more instructions for wireless communication, the one or more instructions comprising:
one or more instructions that, when executed by one or more processors of a user equipment (UE), cause the one or more processors to:
receive, from an assisting UE, sidelink signaling that includes signaling to wake up the UE and resource assistance information indicating one or more measurements associated with a sidelink resource pool that includes one or more time and frequency resources allocated to sidelink transmissions to or from the UE, wherein the signaling to wake up the UE includes a sidelink wakeup signal transmitted separately from the resource assistance information, wherein the resource assistance information is received in one or more physical resource blocks (PRBs) after the sidelink wakeup signal and prior to the sidelink resource pool that includes the one or more time and frequency resources allocated to the sidelink transmissions to or from the UE, wherein the one or more PRBs in which the resource assistance information is received have a preconfigured offset from one or more PRBs in which the sidelink wakeup signal is received; and
perform one or more transmit or receive operations based at least in part on the sidelink signaling.

31. The non-transitory computer-readable medium of claim 30, wherein the one or more measurements associated with the sidelink resource pool include a coarse channel busy ratio (CBR) associated with the sidelink resource pool, wherein the coarse CBR is associated with a level of granularity that is a lower level of granularity relative to a level of granularity associated with a CBR associated with a sub-pool of the sidelink resource pool.

32. An apparatus for wireless communication, comprising:
means for receiving, from an assisting user equipment, sidelink signaling that includes signaling to wake up the apparatus and resource assistance information indicating one or more measurements associated with a sidelink resource pool that includes one or more time and frequency resources allocated to sidelink transmissions to or from the apparatus, wherein the signaling to wake up the apparatus includes a sidelink wakeup signal transmitted separately from the resource assistance information, wherein the resource assistance information is received in one or more physical resource blocks (PRBs) after the sidelink wakeup signal and prior to the sidelink resource pool that includes the one or more time and frequency resources allocated to the sidelink transmissions to or from the apparatus, wherein the one or more PRBs in which the resource assistance information is received have a preconfigured offset from one or more PRBs in which the sidelink wakeup signal is received; and
means for performing one or more transmit or receive operations based at least in part on the sidelink signaling.

* * * * *